United States Patent [19]
Murata et al.

[11] Patent Number: 5,766,753
[45] Date of Patent: Jun. 16, 1998

[54] ELASTIC MEMBER FOR ELECTROPHOTOGRAPHY AND ELECTROPHOTOGRAPHIC DEVICE USING THE SAME

[75] Inventors: Jun Murata, Kawagoe; Yoshiaki Nishimura, Tokyo, both of Japan

[73] Assignee: Canon Kabushiki Kaisha, Tokyo, Japan

[21] Appl. No.: 576,898

[22] Filed: Dec. 22, 1995

[30] Foreign Application Priority Data

Dec. 26, 1994 [JP] Japan .................. 6-322416

[51] Int. Cl.$^6$ .................. B32B 5/16; G03G 15/02
[52] U.S. Cl. .................. 428/323; 399/176; 492/53; 492/56
[58] Field of Search .................. 428/323; 399/176; 492/53, 56

[56] References Cited

U.S. PATENT DOCUMENTS

| | | | |
|---|---|---|---|
| 5,018,640 | 5/1991 | Morofuji et al. | 220/456 |
| 5,557,060 | 9/1996 | Okada et al. | 118/661 |

*Primary Examiner*—Mark Chapman
*Attorney, Agent, or Firm*—Fitzpatrick, Cella, Harper & Scinto

[57] ABSTRACT

The present invention pertains to an elastic member and a charging roller for electrophotography which are provided with an electrical semi-conductive elastic layer on a conductive body with an adhesive layer arranged between them. The adhesive layer contains carbon black and graphite at a total content of 20 to 80 phr as conductive fillers and also contains a thermoplastic elastomer as a binder. Disclosed is an electrophotographic device having an elastic member and an electrophotographic photosensitive body.

15 Claims, 2 Drawing Sheets

5,766,753

ELASTIC MEMBER FOR ELECTROPHOTOGRAPHY AND ELECTROPHOTOGRAPHIC DEVICE USING THE SAME

BACKGROUND OF THE INVENTION

1. Field of the Invention

The present invention relates to an elastic member for electrophotography. More particularly, the present invention relates to such members as a transfer member and a charging member which are used for an electrophotographic device including a copying machine and a laser beam printer. The present invention also relates to an electrophotographic device using the above members.

2. Description of the Related Art

The general structure of an elastic member for electrophotography is such that an electrical semi-conductive elastic layer is prepared on a conductive body, e.g. a core, with an adhesive layer between them. As a matter of course, the electrical semi-conductivity of the elastic member is affected by electrical resistance caused by the adhesive layer. Thus, when the elastic member is used as a transfer member, a problem will occur in that the transfer efficiency toward a transfer agent becomes lower, impairing uniform and excellent transfer. In addition, uniformity of charging and transfer is impeded in the case of uneven electrical resistance, resulting in an inferior image.

Conventionally, carbon black is used as an electrophotographic filler and is blended in an adhesive layer because it provides small electrical resistance at low cost. However, an inferior image may be obtained, since the electrical resistance becomes uneven in some cases due to nonuniformity of carbon black dispersion.

SUMMARY OF THE INVENTION

It is an object of the present invention to provide an elastic member for an electrophotographic device, which member does not exhibit such electrical resistance unevenness due to an adhesive layer as mentioned above. It is another object of the present invention to provide an electrophotographic device which is capable of producing an excellent image using an elastic member which does not exhibit the electrical resistance unevenness due to an adhesive layer.

According to the present invention, an elastic member is prepared on a conductive body with an adhesive layer arranged between them. The adhesive layer contains carbon black and graphite as conductive fillers.

Carbon black is a chemical aggregate of black fine particles, while graphite is a flake-shaped black carbon. In accordance with the present invention, it is possible to obtain uniform and excellent conductivity using a mixture of carbon black and graphite as conductive fillers included in an adhesive layer of the elastic member for electrophotography. It is understood that unevenness caused by nonuniform dispersion of carbon black is improved remarkably by blending flake graphite therein so as to disperse the graphite with carbon black to achieve continuity between them.

DESCRIPTION OF THE PREFERRED EMBODIMENTS

Figure 1:
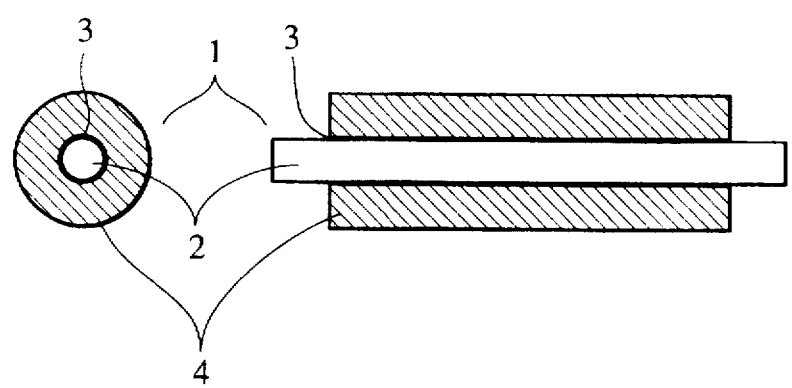
FIG. 1 shows a vertical sectional view (the left figure) and a horizontal sectional view (the right figure) of a roller-shaped elastic member for an electrophotographic device according to the present invention.

Prepared by adhering a conductive body to an electrical semi-conductive elastic layer by the conductive adhesive containing carbon black and graphite, the resultant elastic member reveals good adhesion without uneven electrical resistance. In addition, since peeling does not occur between the conductive body and the elastic layer even after long service, unevenness or variation of electrical resistance is not seen.

Particularly, in the case of employing a styrene-butylene elastomer as a main component, it is possible to provide an adhesive layer which exhibits excellent rubber elasticity, heat resistance, ozone and weather resistance. The adhesive layer contains carbon black and graphite therein at preferably 20 to 80 phr as the total content, i.e. at a ratio of 20 to 80 parts to 100 parts of the binder by weight, since the conductivity becomes low if the content is too small and the elasticity decreases if the content is too large. In addition, the ratio of carbon black to graphite is preferably 1 part to 0.5 to 10 parts by weight.

When the elastic member is used as an elastic roller, such as a transfer roller and a charging roller, a shear force associated with rotation under pressure is loaded on an interface between an electrical semi-conductive layer, i.e. an elastic body, and a core, i.e. a rigid body. Such a shear force is relaxed by the elastic adhesive layer. Thus, it is possible to prevent the adhesive from peeling caused by concentrated stress. As a result, the unevenness or variation of electrical resistance caused by peeling is also avoidable. For the above purpose, a thermoplastic elastomer is suitable for a binder of the adhesive layer. In particular, a styrene-butylene elastomer is preferably used as a main component of the binder among thermoplastic elastomers because of its excellent rubber elasticity, heat resistance, ozone and weather resistance. Moreover, a styrene-butylene elastomer allows those materials with poor adhesion, such as EPDM and SBS, to adhere to each other by denaturing them with various kinds of polar groups, such as functional groups. Other thermoplastic elastomers may be used, such as polyolefin, polyester, polyurethane, acrylic, and butadiene-acrylonitrile elastomers.

A roller-shaped elastic member may be produced by pressing a core in a tube-shaped electrical semi-conductive elastic layer which has been vulcanized and has been provided with an adhesive layer thereon. For example, the above adhesive which has been dissolved in a solvent is coated on a core made of a conductive body and is dried at room temperature. Then the core is pressed in an electric semi-conductive elastic tube which has been vulcanized, and a roller-shaped body is obtained by heating. When the core is pressed in the tube, the coated adhesive layer does not yet exhibit its adhesion; therefore the manufacturing process can be rationalized. For example, it is possible to automate the manufacturing line from the step of pressing a core in a tube to the step of heating them so as to adhere to each other by the adhesive layer.

Concerning the shape of an elastic member of the present invention, it may be selected according to the specification of the electrophotographic device from among various kinds of shapes, such as a roller and a blade.

Referring now to FIG. 1, there is shown a fundamental assembly of a roller-shaped elastic member 1. A cylindrical core 2 is provided with an electrical semi-conductive elastic layer 4 thereon with an adhesive layer 3 therebetween. In the case of a blade-shaped elastic member, an electrical semi-conductive elastic layer is prepared on a flat core with an adhesive layer therebetween. Metals including steel, copper, and stainless steel, as well as metal alloys, are preferably used as a core.

An electrical semi-conductive elastic layer is produced by dispersing conductive fillers, for instance, conductive carbon, graphite, and metal powders, in an elastic body such as rubber and resin matrix. For conductive fillers, a double oxide in particular is preferred, which represents a compound of solid solution composed of two or more kinds of oxides, and which is different from a simple metal oxide. $ZnO \cdot Al_2O_3$, $SnO_2 \cdot Sb_2O_5$ and $In_2O_3 \cdot SnO_3$ are examples of the double oxide. The double oxide exhibits unique conductivity which is not shown by each metal oxide alone, due to the fact that each metal forms a substitutional solid solution, and has a similar atomic radius and different valence value. The specific resistance value of the double oxide is $10^1 \Omega \cdot cm$ to $10^3 \Omega \cdot cm$, which value is higher than that of conductive carbon, reinforcing carbon black, and metal powders of copper, silver, etc., and is lower than that of triiron tetroxide, zinc oxide, etc. ($10^4 \Omega \cdot cm$ and more). Stable electrical semi-conductivity is obtained by adding conductive fillers, which are composed of a double oxide with a specific resistance value of $10^{1\Omega}$ cm to $10^3 \Omega \cdot cm$, in an amount not impairing the material properties of the electrical semi-conductive elastic layer. Thus, excellent reproducibility and stable mass producibility are achieved. In particular, $ZnO \cdot Al_2O_3$ is preferable among the above double oxides because it has a specific resistance of $10^2 \Omega \cdot cm$ to $10^3 \Omega \cdot cm$, which value is ideal for resistance stability in electrical semi-conductive regions, it is easily dispersed in a polymer dispersion medium such as resin and rubber, it has excellent workability at low cost, and it provides suitable resistance by doping of Al ($Al_2O_3$). Preferably, the double oxide is contained in an elastic body from 5% to 40% by weight, in particular, 10% to 30% by weight.

As an elastic body, the following may be used: rubber such as EPDM, polybutadiene, natural rubber, polyisoprene rubber, SBR, CR, NBR, silicon rubber, urethane rubber, and epichlorohydrin rubber; a thermoplastic elastomer such as polystyrene elastomers including RB (butadiene resin) and SBS (a styrene-butadiene-styrene elastomer), a polyolefin elastomer, a polyester elastomer and polyurethane elastomer; and other polymeric materials, such as polyurethane, polystyrene, PE, PP, PVC, acrylic resin, styrene-vinylacetate copolymer, butadiene-acrylonitrile copolymer, and the like. The elastic body may be used as either a foamed body or solid rubber. In addition, other additives may be included in the elastic body, for example, a reinforcing agent, insulating oil, and fillers.

Electrical resistance is preferably $10^4 \Omega$ to $10^{10} \Omega$ per 1 $cm^2$ of the electrical semi-conductive elastic layer from the core to the surface. A photosensitive member can be charged by a voltage applied from outside to the core. More particularly, charging is realized by contacting the elastic member to the surface of the photosensitive member utilizing the fact that discharging occurs through small spaces between the photosensitive member and the elastic member, i.e. wedge-shaped spaces exist on both sides of the contact line. The elastic member is arranged to be in contact with the photosensitive member so as to produce and maintain such spaces.

Figure 2:
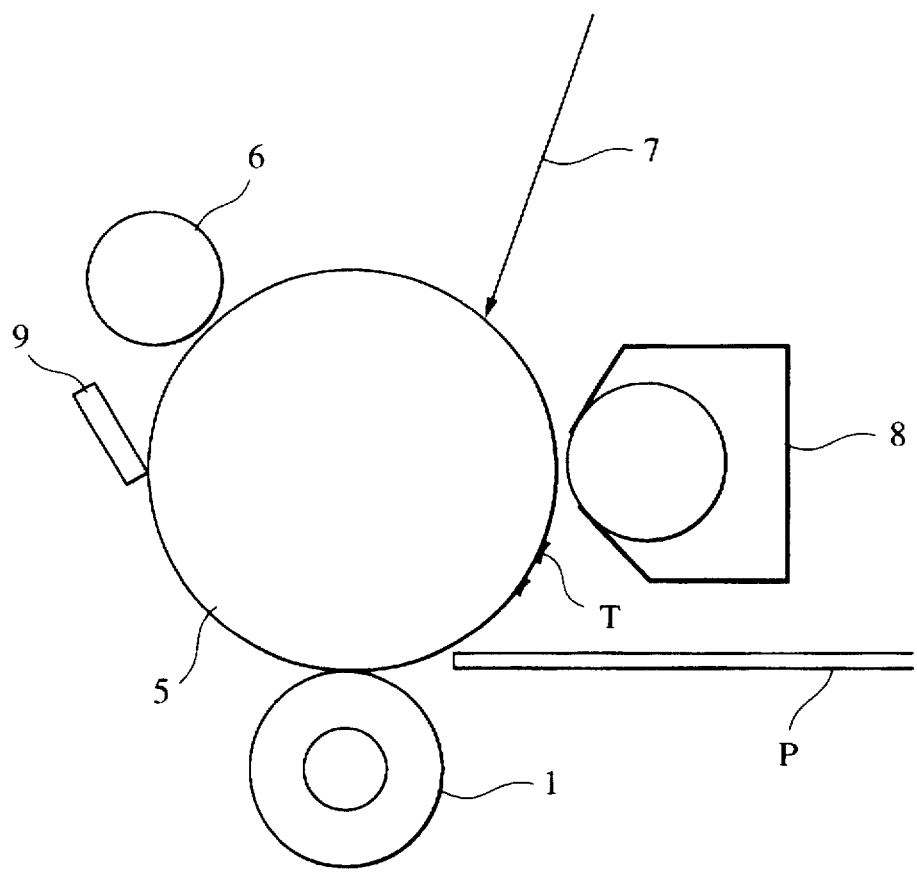
FIG. 2 shows a typical view of an electrophotographic device used in the present embodiment.

In the present invention, a plurality of elements or components of an electrophotographic apparatus such as a photosensitive member, charging member, developing means and cleaning means in FIG. 2 may be integrally assembled into a process cartridge, so that the cartridge may be detachably mountable to the apparatus main body. For example, an elastic member of the invention used for a charging member and, optionally, at least one component selected from a developing means and cleaning means, may be integrally assembled together with a photosensitive member into a process cartridge, and such a cartridge may be attached to or detached from the apparatus body by the medium of a guiding means such as a rail of the apparatus body. In a preferred embodiment, a charging member and/or developing means may be used together with a photosensitive member to constitute a process cartridge.

An elastic member for an electrophotographic device can be used not only for transfer, primary charging, and removal of charging but also for feeding a paper supplying roller, and the like. Sometimes, a portion of the transfer material butting on the feeding roller is charged by friction which occurs between them, providing the transfer material with uneven charging. The elastic member is employed to improve a nonuniform image caused by the uneven charging mentioned above.

The elastic member of the present invention can be used for various kinds of photosensitive members, such as an OPC (organic photo-conductor) photosensitive member, A-Si, Se, and ZnO. The elastic member of the present invention is also capable of being employed in various kinds of electrophotographic devices, such as a copying machine, a laser beam printer, LED printer, and electrophotographic application device including an electrophotolithographic system.

Further objects, features and advantages of the present invention will become apparent from the following description of the preferred embodiments with reference to the attached drawings.

EMBODIMENT 1

To prepare an adhesive, the following materials are dissolved and dispersed in 500 phr of toluene using a ball mill: 20 phr of carbon black ("Conductex 975" manufactured by Colombian Carbon) and 30 phr of graphite, having a diameter of 10 to 20 microns, as conductive fillers; 100 phr of a styrene-butylene elastomer ("Rabalon" manufactured by Mitubishi Yuka) and 20 phr of rosin modified xylol resin (tackifier) as a binder; and 10 phr of micro crystallin wax. A roller-shaped elastic member is produced using the above adhesive, as follows.

A material for forming an electrical semi-conductive elastic layer is prepared by adding $ZnO-Al_2O_3$ (conductive zinc oxide 23K-S, manufactured by Hakusuikagaku Kogyo) as a double oxide to EPDM. The resultant material has good work reproducibility and excellent stability without unevenness in electrical resistance. After being expanded by a foaming agent, the material is vulcanized to obtain a tube. The above adhesive is coated on a stainless steel core by a roll coater and is dried to touch. Then the core is pressed in the tube and is heated in an oven at 200° C. for 10 minutes. By polishing the surface of the electrical semi-conductive elastic layer, a roller-shaped elastic member is obtained, whose core diameter and a outer diameter are 6 mm and 16 mm, respectively, and the length for the core and for the electrical semi-conductive elastic layer are 250 mm and 230 mm, respectively. The electrical resistance of the elastic member is $10^9 \Omega$, which resistance is represented per 1 $cm^2$ of the member from the core to the surface.

The roller-shaped elastic member obtained according to the above process is butted on a stainless roller having a diameter of 40 mm, with a pressure of 300 g at both ends of the rollers. Under the above conditions, the roller-shaped elastic member is rotated at a circumferencial speed of 100 mm/sec, and a direct current voltage of 2 kv is applied between the cores. Then the current value between the cores is determined so as to obtain the maximum/minimum values of the circumferential resistance as circumferential unevenness, which is 3%.

The elastic member is set in an electrophotographic device (a laser beam printer) as a transfer member so as to evaluate the image obtained therefrom. FIG. 2 shows a diagrammatic view of the electrophotographic device. According to this electrophotographic device, an OPC drum 5, which is sensitized for near infrared light, is used as a photosensitive member. After uniformly charging the OPC drum 5 negative by contacting with a charging roller 6, an electrostatic latent image is formed by lowering the voltage of the imaging portion by laser light 7 which is modulated by image signals and which is raster scanned. The latent image is visualized by negative toner contained in a developer unit 8. Then, a toner image T on the OPC drum 5 is transferred to a transfer material P by a roller-shaped elastic member 1 used for transfer, to which member is applied a positive voltage. After that, the transfer member P to which the toner image T is transferred is fed to a fuser (not shown in the figure) so as to permanently fix the toner image T. The toner left on the OPC drum 5 after the transfer is cleaned by a cleaner 9, and then, the same process is repeated.

In accordance with this device, reversal development is performed using an OPC drum with a diameter of 40 mm and an insulating magnetic toner of a single component, at a voltage for dark portion ($V_D$) of $-600$ V and a voltage for light portion ($V_L$) of $-100$ V. Copying paper weighing 64 g/m$^2$ is employed as the transfer material. The feeding speed is 40 mm/sec.

An electrical semi-conductive urethane rubber roller with a resistance of $10^6$ $\Omega$ is used as a charging roller 6. The roller is obtained by forming an electrical semi-conductive layer on a core using the conductive adhesive mentioned above for adhering the layer and the core. Electrical resistance is represented per 1 cm$^2$ of the elastic member from the core to the surface. The charging roller 6 is kept being pressed to the surface of the OPC drum 5 at a predetermined pressure, such as a linear load of 0.01 to 0.2 kg/cm, and the roller uniformly charges the photo-sensitizing body by applying a predetermined voltage. Although a charging roller is employed as a charging means according to this embodiment, a conventional corona charging device may be used.

With respect to a pitch-black image and a half-tone image, the above electrophotographic device reveals uniform and excellent initial transfer properties without unevenness, such as local extreme decrease in image density. Furthermore, even after a continuous durability test using two hundred thousand sheets, the device maintains the above transfer properties because peeling does not occur between the electrical semi-conductive layer and the core.

In addition, the charging roller also reveals uniform charging after long service without conductivity failure caused by peeling and the like.

EMBODIMENT 2

To prepare a conductive adhesive, 100 phr of ethylene-polyvinylacetate copolymer ("Dumilan" manufactured by Takeda Yakuhin Kogyo), 20 phr of hydrogenerated rosin, and 15 phr of paraffin wax are employed as a binder, and the same conductive fillers and solvent as in Embodiment 1 are also used. A roller-shaped elastic member is produced in the same manner as in Embodiment 1 except that the above adhesive is used instead. Evaluation is made similarly to Embodiment 1. Uniform and excellent transfer properties are obtained at the early stage and even after a continuous durability test using one hundred thousand sheets, as is seen in Embodiment 1.

COMPARATIVE EXAMPLE 1

An elastic roller is prepared by the same process as in Embodiment 1 except that 10 phr of carbon black ("Ketjen Black EC" manufactured by Ketjen Black International) and 20 phr of Conductex are used as conductive fillers. The roller shows electrical resistance of $10^{10}\Omega$ and circumferencial unevenness of 45%. Evaluation for transfer properties is made similarly to Embodiment 1 and it is revealed that local extreme decrease in image density occurs both in a pitch-black image and a half-tone image.

Moreover, evaluation is made for transfer properties of a roller which is obtained by the same method as Embodiment 1 except that 50 phr of graphite alone is added as the only conductive fillers. Electrical resistance of the roller is $10^{10}\Omega$. It is revealed that the total image density decreases in a pitch-black image, resulting in a transfer failure.

COMPARATIVE EXAMPLE 2

For preparing an adhesive having 20% solid components, a mixture of the following materials is dissolved in MEK to 100 phr of NBR (totally containing 35% acrylonitrile, manufactured by Nippon Gosei Gomu) using a ball mill: 20 phr of graphite with a diameter of 10 to 20 microns; 15 phr of carbon black (Ketjen Black EC); 20 phr of alkylphenol resin as a tackifier; 50 phr of DBP (dibutyl phthalate) as a plasticizer; 5 phr of ZnO; 1.5 phr of sulfur; 1 phr of TS (tetramethylthiuram monosulfide) and 2 phr of DM (dibenzothiazoile disulfide) as a vulcanization accelerator; and 2 phr of NS-6(2,2'-methylene bis(4-methyl-6-P-butyl) phenol as an antioxidant.

An elastic roller is produced using the above adhesive. The roller shows electrical resistance of $10^9\Omega$ and circumferencial unevenness of 5%. Evaluation is made similarly to Embodiment 1 and reveals uniform and excellent initial transfer properties without nonuniformity, such as local extreme decrease in image density, both for a pitch-black image and a half-tone image. However, peeling occurs between the electrical semi-conductive layer and the core after a continuous durability test using fifty thousand sheets. As a result, the electrical resistance increases to $10^1\Omega$, and total image density of a pitch-black image becomes lower. Since the circumferencial unevenness is elevated to 40%, local extreme decrease in image density occurs both in a pitch-black image and a half-tone image.

EMBODIMENT 3

An elastic roller is prepared by the same process as Embodiment 1 except that 10 phr of carbon black ("Ketjen Black EC") and 50 phr of graphite, with a diameter of 10 to 20 microns, are used as conductive fillers. The roller shows electrical resistance of $10^9\Omega$ and circumferencial unevenness of 2.5%. Evaluation for transfer properties is made according to Embodiment 1, providing a result similar to Embodiment 1.

What is claimed is:

1. An elastic member for electrophotography comprising:
   an electric semi-conductive elastic layer;

a conductive body; and an adhesive layer being arranged between said elastic layer and said conductive body, wherein said adhesive layer contains carbon black and graphite serving as conductive fillers and a thermoplastic elastomer serving as a binder.

2. An elastic member for electrophotography as set forth in claim 1, wherein the total content of said carbon black and said graphite in said adhesive layer ranges from 20 to 80 phr.

3. An elastic member for electrophotography as set forth in claim 2, wherein said adhesive layer comprises said carbon black and said graphite at a ratio of 1 part to 0.5 to 10 parts by weight.

4. An elastic member for electrophotography as set forth in claim 1, wherein said thermoplastic elastomer is a styrene-butylene elastomer.

5. A charging roller for electrophotography comprising:

an electric semi-conductive elastic layer;

a conductive body; and an adhesive layer being arranged between said elastic layer and said conductive body, wherein said adhesive layer contains carbon black and graphite serving as conductive fillers.

6. A charging roller for electrophotography as set forth in claim 5, wherein the total content of said carbon black and said graphite in said adhesive layer ranges from 20 to 80 phr.

7. A charging roller for electrophotography as set forth in claim 6, wherein said adhesive layer comprises said carbon black and said graphite at a ratio of 1 part to 0.5 to 10 parts by weight.

8. A charging roller for electrophotography as set forth in claim 5, wherein said adhesive layer comprises a thermoplastic elastomer therein as a binder.

9. An electrophotographic device with an elastic member and an electrophotographic photosensitive member, said elastic member comprising:

an electric semi-conductive elastic layer;

a conductive body; and an adhesive layer being arranged between said elastic layer and said conductive body, wherein said adhesive layer contains carbon black and graphite serving as conductive fillers and a thermoplastic elastomer serving as a binder.

10. An electrophotographic device as set forth in claim 9, wherein the total content of said carbon black and said graphite in said adhesive layer ranges from 20 to 80 phr.

11. An electrophotographic device as set forth in claim 9, wherein said elastic member is a transfer member.

12. An electrophotographic device as set forth in claim 9, wherein said elastic member is a charging member.

13. A process cartridge, detachably mountable to an image forming apparatus main body, comprising: a photosensitive member and a charging member integrated into the cartridge; wherein said charging member comprises a resin comprising an electric semi-conductive elastic layer;

a conductive body; and an adhesive layer being arranged between said elastic layer and said conductive body, wherein said adhesive layer contains carbon black and graphite serving as conductive fillers and a thermoplastic elastomer serving as a binder.

14. A process cartridge as set forth in claim 13, wherein the total content of said carbon black and said graphite in said adhesive layer ranges from 20 to 80 phr.

15. A process cartridge as set forth in claim 14, wherein said adhesive layer comprises said carbon black and said graphite at a ratio of 1 part to 0.5 to 10 parts by weight.

* * * * *

UNITED STATES PATENT AND TRADEMARK OFFICE
CERTIFICATE OF CORRECTION

PATENT NO. : 5,766,753

DATED : June 16, 1998

INVENTOR(S) : JUN MURATA, ET AL.

It is certified that error appears in the above-identified patent and that said Letters Patent is hereby corrected as shown below:

COLUMN 3:

Line 24, "$10^{1\Omega}.cm$" should read --$10^{1}\Omega \cdot cm$--.

Signed and Sealed this

Ninth Day of March, 1999

Attest:

Q. TODD DICKINSON

Attesting Officer

Acting Commissioner of Patents and Trademarks